US008185837B2

(12) United States Patent
Liu et al.

(10) Patent No.: US 8,185,837 B2
(45) Date of Patent: May 22, 2012

(54) USER INTERFACE FRAMEWORK AND METHOD FOR UTILIZING SAME

(75) Inventors: Chang Liu, San Gabriel, CA (US);
Giuseppe Manzari, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 860 days.

(21) Appl. No.: 12/287,277

(22) Filed: Oct. 7, 2008

(65) Prior Publication Data
US 2010/0005407 A1     Jan. 7, 2010

Related U.S. Application Data

(60) Provisional application No. 61/133,746, filed on Jul. 1, 2008.

(51) Int. Cl.
*G06F 3/048*     (2006.01)
(52) U.S. Cl. ............. 715/764; 715/760; 715/762
(58) Field of Classification Search ............... 715/764, 715/760, 762
See application file for complete search history.

(56) References Cited

U.S. PATENT DOCUMENTS

| | | | | |
|---|---|---|---|---|
| 6,327,628 | B1* | 12/2001 | Anuff et al. | 719/311 |
| 6,826,594 | B1* | 11/2004 | Pettersen | 709/203 |
| 7,047,318 | B1* | 5/2006 | Svedloff | 709/246 |
| 2008/0193100 | A1* | 8/2008 | Baum et al. | 386/52 |
| 2008/0256469 | A1* | 10/2008 | Jain et al. | 715/764 |

FOREIGN PATENT DOCUMENTS

WO    WO 2006056985 A2 *    6/2006

* cited by examiner

*Primary Examiner* — Weilun Lo
*Assistant Examiner* — Rashedul Hassan
(74) *Attorney, Agent, or Firm* — Farjami & Farjami LLP

(57) ABSTRACT

There is presented a user interface (UI) framework and systems and methods for its use. Such a system comprises a content server and a rich media content generated by a compiling of a rich media source code, wherein the rich media content is hosted by the content server. The rich media content includes a first embedded graphics environment configured to present display assets of the rich media content, and a first UI framework ported to the first embedded graphics environment, the first UI framework configured to interact with the first embedded graphics environment to modify the display assets of the rich media content in response to data received from a UI layout feed. The first UI framework is configured to modify the display assets of the rich media content without requiring modifications to the rich media source code or recompiling of the rich media source code.

18 Claims, 4 Drawing Sheets

USER INTERFACE FRAMEWORK AND METHOD FOR UTILIZING SAME

RELATED APPLICATIONS

This application claims priority to U.S. Provisional Application No. 61/133,746, filed on Jul. 1, 2008, which is hereby incorporated by reference in its entirety.

BACKGROUND OF THE INVENTION

1. Field of the Invention

The present invention relates generally to the management of network content. More particularly, the present invention relates to updating network content using a content management system.

2. Background Art

As the user base of packet networks, such as the Internet, has broadened to include sophisticated vendors and consumers, ever greater importance has been placed on those networks as sources of advertising and entertainment. Savvy and increasingly demanding consumers desire to access frequently updated information, and have increasingly lofty expectations of the richness of web based content. Advertisers, seeking to meet these enhanced consumer expectations, have found the venerable Hypertext Markup Language (HTML) format used in much of early web design to be too constraining. As a result, more and more content has been developed using formats more enabling of the dynamic, rich media experience preferred by consumers. Embedded graphics applications such as Flash and Silverlight, for example, have made it possible for advertisers to provide the rich media content that consumers now demand.

However, conventional approaches to providing rich media content, such as rich web content, impose substantial burdens on both the graphical designers responsible for the look and feel of the content, and the content developers, i.e., programmers, charged with producing the application source code providing the rich media experience. FIG. 1 shows flowchart 100 of a process flow for producing and updating rich media content using a conventional approach. As shown in FIG. 1, the conventional process flow includes an iterative interaction between designers and programmers as rich media content is first provided, and later modified.

Beginning with step 110, a typical conventional approach to providing rich media content includes pre-determination of the display assets to be included in the content, followed by generation of the source code in step 120. Typically the pre-determined display assets are specified in the source code, requiring that the designers anticipate a full menu of display assets prior to coding. In addition, the conventional approach requires that the programmers be sufficiently familiar with the aesthetic vision of the designers to appropriately capture the predetermined display assets in the coding.

Following steps 110 and 120, which, as described, often require joint effort on the part of the design and development teams, the source code is compiled in step 130 and the resulting rich media content is published in step 140. Thus, steps 110 through 140 typically require collaborative effort between graphical designers and programmers, and result in rich media content that is limited in expression to those display assets predetermined by the designers and coded by the developers. Subsequent changes to the display assets, such as re-skinning, or introducing theme and/or logo changes, for example, require going back into the source code to appropriately adjust the display assets defined within.

As a result, modifying rich media content according to the conventional approach requires repetition of steps similar to steps 110 through 140. That is to say, the changes or modifications to the pre-determined display assets are determined by the graphical designers in step 150, which echoes initial step 110. Then, the source code must be edited by the programmers to incorporate the new or modified definitions into the code in step 160. The code must be recompiled in step 170 and republished in step 180. Moreover, steps 150 through 180 must be repeated for additional modifications to the display assets made after republication in step 180.

In short, the conventional approach requires the participation of both designers and programmers for the delivery of rich media content, both during its production, and during its modification. In addition, the conventional approach requires that the two working groups, i.e., graphic designers and programmer, have a sufficient understanding of the discipline practiced by the other so that they may work in productive cooperation. Also, because the conventional approach typically requires changes to the source code for each instance of modification, those modifications require recompiling the source code and republishing the rich media content. Because modifying existing rich media content is such a burdensome undertaking according to the conventional approach, there are significant incentives to delay introduction of changes, and to batch changes so as to spread the resource costs for introducing content modifications over time.

The foregoing drawbacks of the conventional approach to producing and modifying rich media content have been described by reference to a single graphics environment. In some cases, however, it may desirable to make the same rich media content available across multiple graphics environments. For example, a producer of rich media content may desire to provide the content in a Flash format, due to Flash's penetration of personal computing platforms, and also in Java, for mobile device users seeking to enjoy the rich media experience. In that situation, in addition to the drawbacks described previously, are the significant disadvantages flowing from the need to support a duplication of the rich media content in the distinct graphics environments. Those additional disadvantages may include, for example, the resource commitments required to produce multiple versions of the content, as well as the problem of harmonizing the available display assets, so that updates and changes to content rendered in one graphics environment are appropriately reflected in the others.

Accordingly, there is a need to overcome the drawbacks and deficiencies in the art by presenting a solution enabling content designers to dynamically update graphical features of existing content, for example by means of a content management system, without requiring that the source code of the existing content be modified. It would additionally be advantageous for the solution to enable concurrent updating of existing content across multiple graphics environments.

SUMMARY OF THE INVENTION

There is provided a user interface framework and method for utilizing same, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
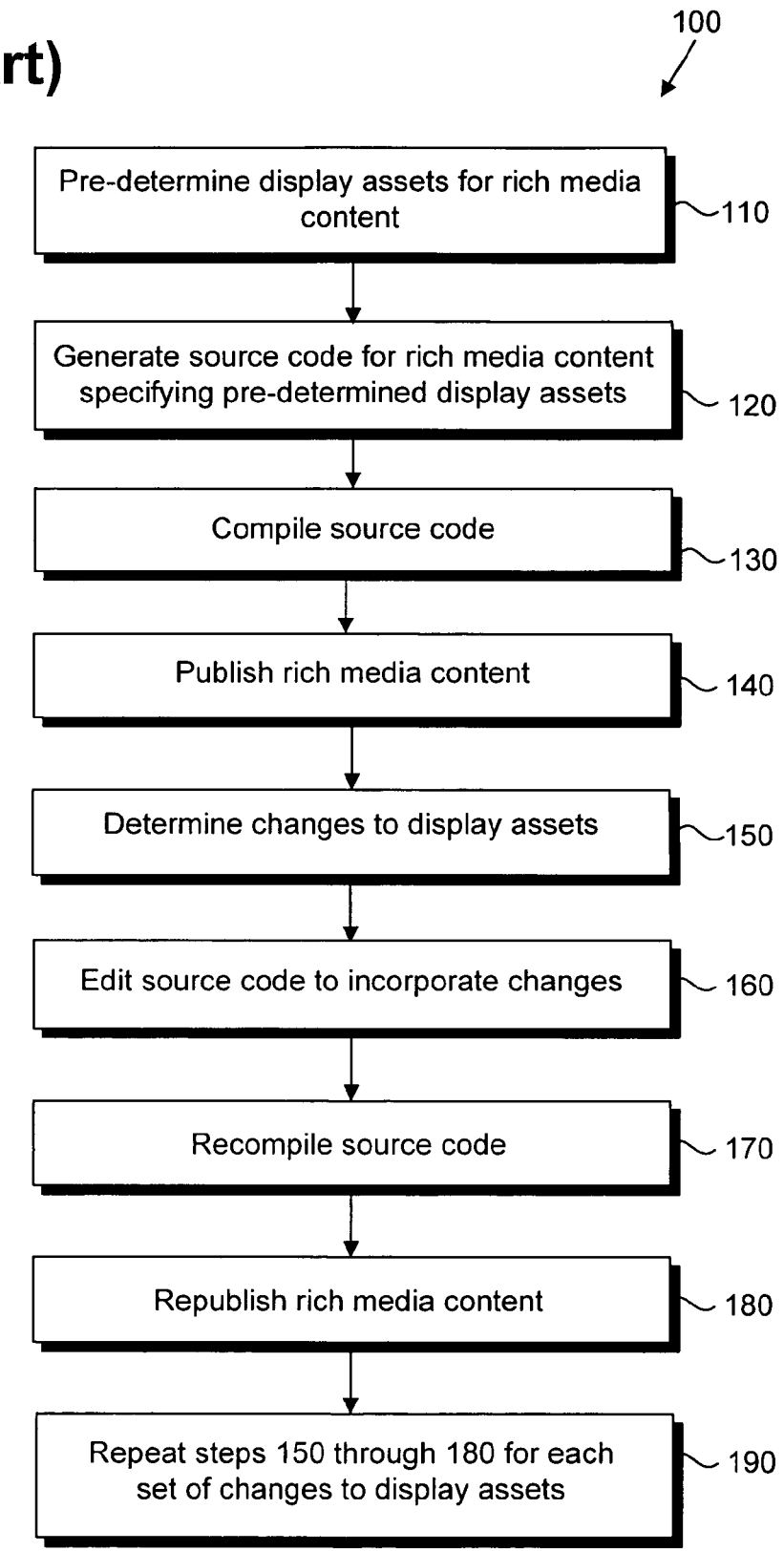
FIG. 1 shows flowchart 100 of a conventional process flow for producing and updating rich media content.

The present application is directed to a user interface framework suitable for use with the wide array of embedded graphics applications capable of providing rich media content, and a method for utilizing that framework. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2:
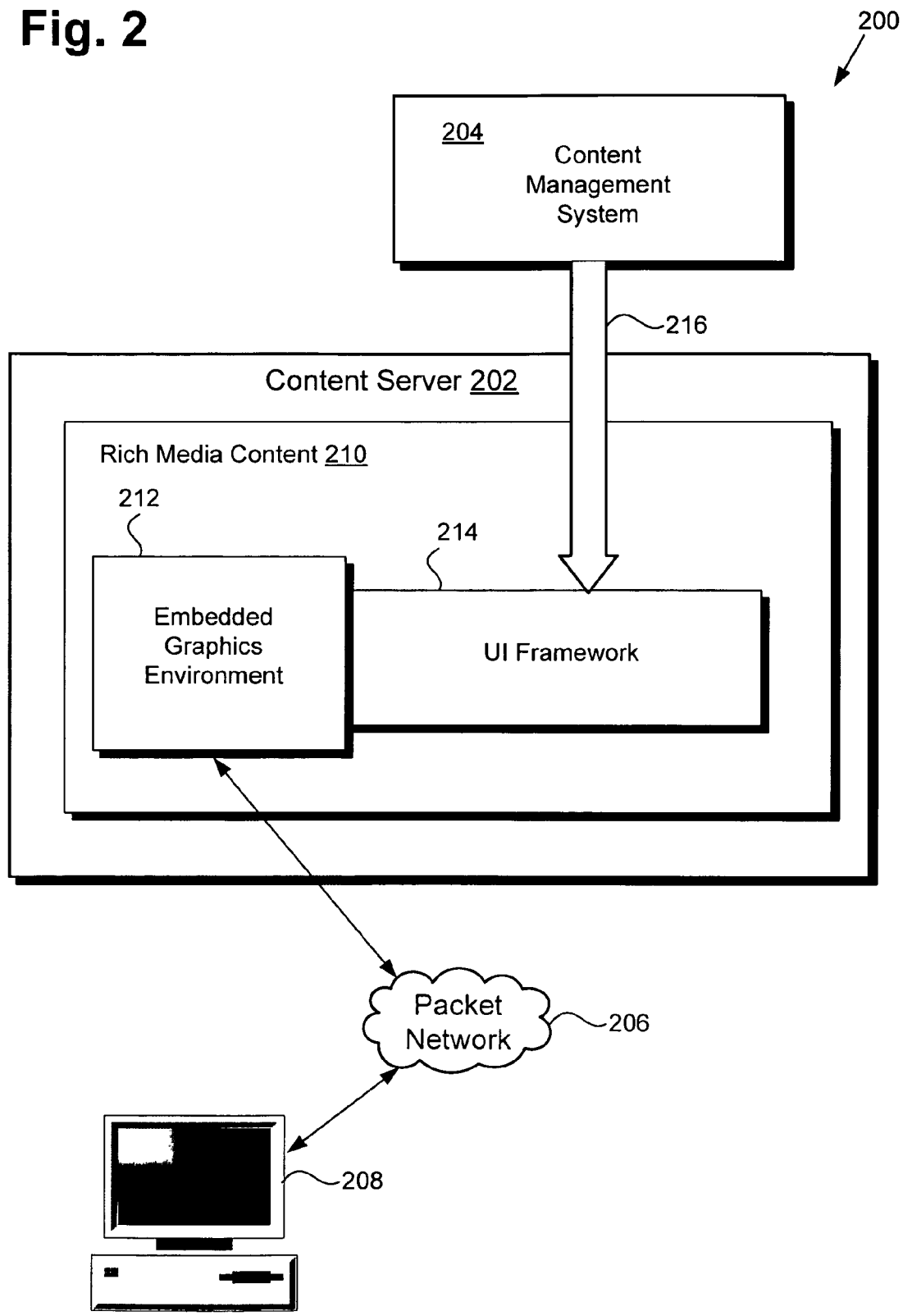
FIG. 2 shows a block diagram of a system for enabling dynamic updating of rich media content using a user interface framework, according to one embodiment of the present invention.

The present inventors have recognized the drawbacks and deficiencies of conventional solutions to producing and modifying rich media content, and have succeeded in overcoming those disadvantages by providing a user interface framework and method for its use. FIG. 2 shows a diagram of exemplary system 200 for enabling dynamic updating of rich media content using a user interface framework, according to one embodiment of the present invention. In the embodiment of FIG. 2, system 200 comprises content server 202 including rich media content 210, and content management system 204. Rich media content 210 includes embedded graphics environment 212, and user interface framework (UI framework) 214, which is accessible by content management system 204 via user interface layout feed (UI layout feed) 216. Also shown in FIG. 2 are packet network 206 and client system 208 represented as a personal computer (PC).

According to the embodiment of FIG. 2, a designer (not shown in FIG. 2) of rich media content 210 may utilize content management system 204, UI layout feed 216, and UI framework 214 to produce and/or modify display assets presented by embedded graphics environment 212. As a result, a consumer (also not shown in FIG. 2) using client system 208 and packet network 206 can enjoy rich media content 210 hosted on content server 202, which may be frequently modified by the designer to accommodate rapidly changing consumer preferences. Although in the embodiment of FIG. 2, client system 208 is represented as a PC, in one embodiment client system 208 may be a mobile communication device such as a tablet computer, mobile telephone, personal digital assistant (PDA), digital media player, or wireless gaming console for example.

As shown in FIG. 2, rich media content 210 may be accessed through packet network 206. In one such embodiment, rich media content 210 may comprise a rich web application, accessible over a packet network such as the Internet, for example. Alternatively, rich media content 210 may reside on a server supporting a local area network (LAN), provided at a recreational venue such as a theme park, for instance, or included in another type of limited distribution network.

Embedded graphics environment 212 corresponds to any embedded graphics application usable to display rich media content 210. Thus embedded graphics environment 212 may correspond to such presently available applications as Flash, Silverlight, or Java, for example. For the purposes of the present example, let us assume that embedded graphics environment 212 is a Flash environment for supporting rich media content 210. UI framework 214 and UI layout feed 216, together, form a logic and data bridge enabling dynamic modification of the display assets available for use by the Flash application. Thus, UI framework 214 and UI layout feed 216 enable a designer to control the Flash application providing rich media content 210 using content management system 204.

User interface framework 214 may comprise a universal component library, for example, and/or a variety of data containers, providing respective elements and contexts from which complex graphical constructs can be assembled. UI framework 214 is ported to embedded graphics environment 212, and can provide a logical interface between external UI layout feed 216 provided by content management system 204, and the Flash application corresponding to embedded graphics environment 212. Because UI framework 214 may contain the elements and containers from which display assets are produced, rather than the final form of those assets, the universe of assets available to the Flash application need not be predetermined when the source code is written, nor, significantly, does the source code need to be edited and recompiled to accommodate selection or modification of those display assets.

UI framework 214 may be imported into the source code for the Flash application when the code is originally produced, for example. In the case of Flash, UI framework may be distributed through archive .swc files, runtime shared libraries, and ActionScript 3.0 files, for example. Where embedded graphics environment 212 corresponds to a different graphics application, UI framework 214 may be imported and distributed during source code composition in an analogous manner. In one embodiment, UI framework 214 may be configured to respond to its own events, overriding and/or canceling native Flash events as they occur. Similarly, when implemented in other embedded graphics environments, UI framework 214 may be coded into the application to manage layout and to control events.

It is noted that although in the embodiment of FIG. 2, UI framework 214 is shown to be included in rich media content 210, residing on content server 202, more generally, UI framework 214 may be stored on any suitable computer-readable medium. For example, instructions comprising UI framework 214 which, when executed by a computer, such as content server 202, enable a designer of rich media content to control the appearance of display assets presented by means of embedded graphics environment 212 so as to produce and/or modify those display assets dynamically.

The expression "computer-readable medium," as used in the present application, refers to any medium that provides instructions to a computer, such as content server 202. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), DVD, or other optical disc; a RAM, programmable read-only memory (PROM), erasable PROM (EPROM), FLASH memory, or a transmission carrier wave.

UI layout feed 216 may take the form of an Extensible Markup Language (XML) feed or a JavaScript Object Notation (JSON) feed, for example, specifying the graphics layout determined by a graphical designer using content management system 204. UI framework 214 enables implementation of the layout instructions delivered by UI layout feed 216 within the specific context of embedded graphics environment 212, in this example Flash.

Because UI framework 214 can be incorporated into a variety of distinct embedded graphics environment, to manage layout and to control events in response to inputs provided by UI layout feed 216, it enables layout management and control over multiple platforms. In addition, because resulting rich media content 210 may be produced using the containers and components defined by UI framework 214, substantially the same display assets can be supported by the various embedded graphics environments with which UI framework 214 can interface, providing cross-platform consistency in the look and feel of rich media content 210. Moreover, because UI layout feed 216 may delivered to UI framework 214 in a generalized data format, such as an XML feed, regardless of the specific identity of embedded graphics environment 212, it is possible for a designer using content management system 204 to effectuate substantially similar graphical layouts across multiple platforms concurrently, using a single layout feed.

Figure 3:
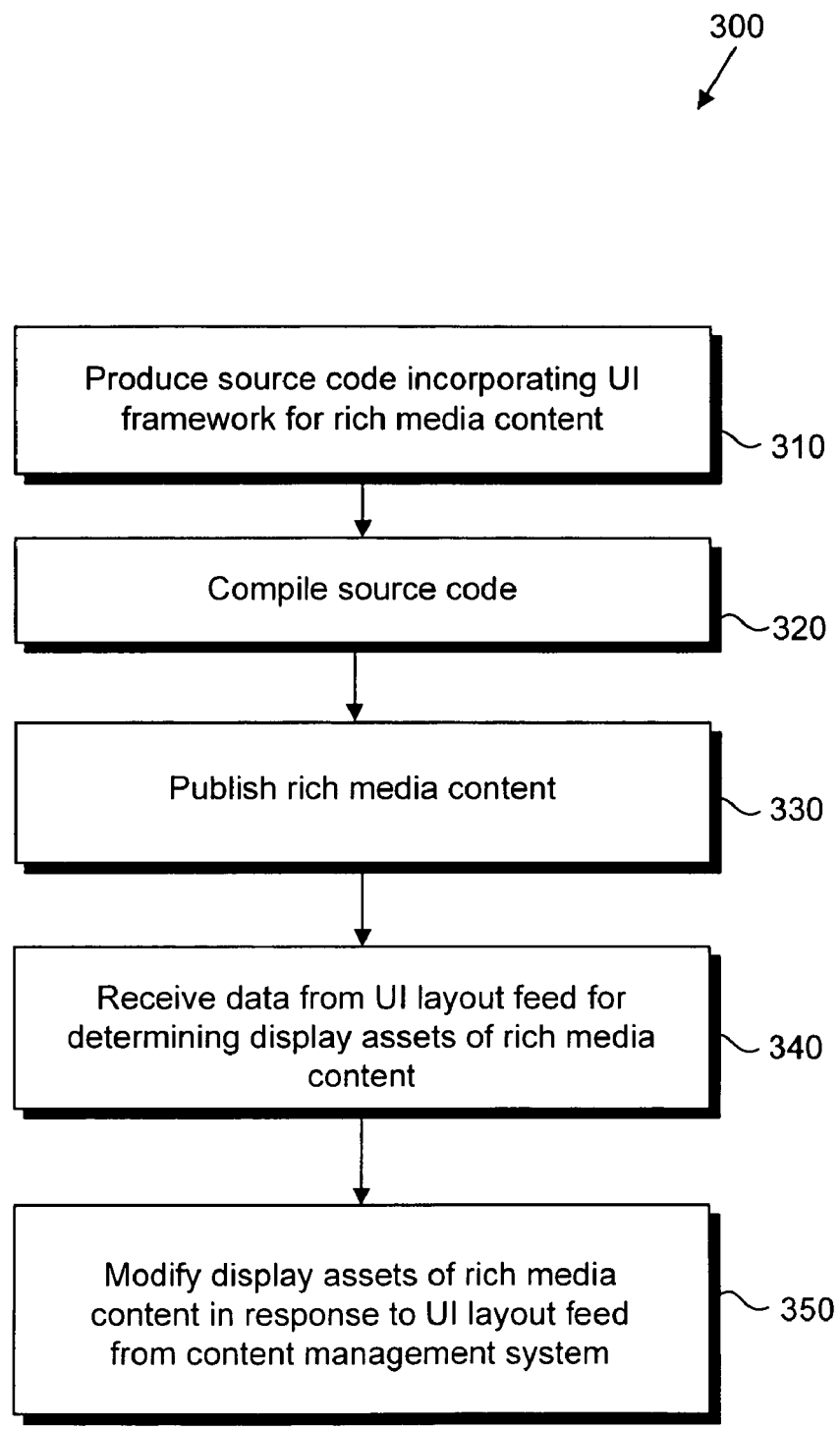
FIG. 3 is a flowchart presenting a process flow for production and/or modification of rich media content, according to one embodiment of the present invention.

Turning now to FIG. 3, FIG. 3 presents a process flow for production and/or modification of rich media content, according to one embodiment of the invention. Certain details and features have been left out of flowchart 300 that are apparent to a person of ordinary skill in the art. For example, a step may consist of one or more substeps or may involve specialized equipment or materials, as known in the art. While steps 310 through 350 indicated in flowchart 300 are sufficient to describe one embodiment of the present invention, other embodiments may utilize steps different from those shown in flowchart 300, or may include more, or fewer steps.

Starting with step 310 in FIG. 3 and referring to FIG. 1 in which a conventional approach to producing and modifying rich media content is described, for comparative purposes, step 310 of flowchart 300 comprises producing source code incorporating a UI framework for rich media content. As described in relation to FIG. 2, because the UI framework may be utilized by a designer to specify a graphical layout at any time after the source code has been compiled, the display assets included in that layout need not be pre-determined when the source code is produced. In addition, the present UI framework decouples the respective contributions of graphical designers and programmers. As a result, neither working groups is required to acquire the professional expertise of the other, nor is either constrained by the limitations imposed by the other's discipline.

Flowchart 300 continues with step 320, which comprises compiling the source code produced in 320. Comparison with FIG. 1 highlights one of the advantages of the present embodiment. While in the conventional approach, changes to the display assets included in rich media content require that the source code be edited and the content recompiled for each set of changes, the present embodiment avoids that drawback. Because graphical layout is determined by a UI layout feed delivered to a UI framework incorporated into the source code, changes to display assets can be achieved on the fly, without editing the source code or recompiling the application providing the rich media content. As a result, according to the present embodiment, the source code only needs to be compiled once, at step 320.

Following compiling, the rich media content can be published in step 330. Subsequently, a graphics designer is free to produce or modify the display assets presented in the rich media content simply by providing the UI framework incorporated into the application with a UI layout feed specifying the combination of components and containers required to produce the desired display assets. Thus the method of flowchart 300 continues with step 340 comprising receiving data from the UI layout feed for determining the display assets of the rich media content, followed by appropriately modifying the display assets of the rich media content in step 350. Comparison of FIG. 3 and FIG. 1 provides some indication of the advantages and efficiencies provided by the present solution.

For example, whereas in the conventional approach contributions from both programmers and designers are required in steps 110 and 120 of FIG. 1 for generation of the source code, according to the present embodiment programmers may work independently of designers to produce the application source code in step 310. Furthermore, after publication of the rich media content in step 140 of the conventional approach, any changes to the graphics layout of the rich media content requires participation of the programmers, who must recode and recompile the application. By contrast, according to the embodiment of FIG. 3, the participation of programmers is no longer required after compiling in step 320. That is to say that all subsequent changes to graphical layout can be effectuated by the graphical designers alone, due to incorporation of the present invention's UI framework into the original source code.

Thus, FIG. 3 describes a process flow that collapses steps 110 through 190 of the conventional approach of FIG. 1 into many fewer steps. In addition, the steps described in FIG. 3 decouple the contributions of programmers and designers, so that programmers alone may contribute to steps 310 and 320, while designers alone may contribute to steps 330 through 350. Moreover, according to the embodiment of FIG. 3, designers alone can render all future changes to the graphical layout of the rich media content through use of a content management system, without additional programmer support.

Figure 4:
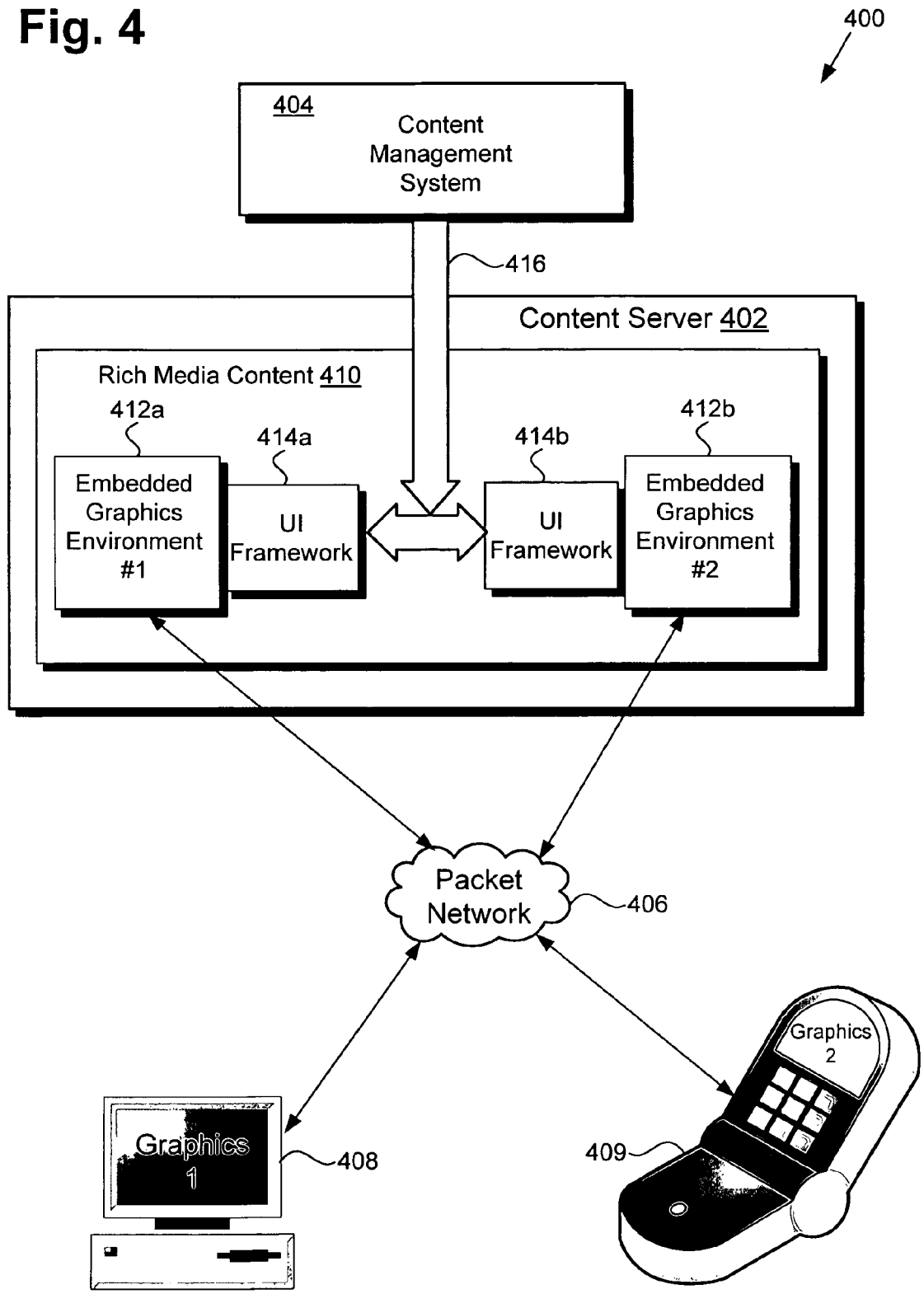
FIG. 4 shows a block diagram of a system for enabling dynamic updating of rich media content across multiple platforms using a user interface framework, according to one embodiment of the present invention.

Turning now to FIG. 4, FIG. 4 shows a diagram of exemplary system 400 for enabling dynamic updating of rich media content across multiple platforms using a UI framework, according to one embodiment of the present invention. In the embodiment of FIG. 4, system 400 comprises content server 402 including rich media content 410, and content management system 404, corresponding respectively to content server 202 including rich media content 210, and content management system 204 in FIG. 2. As in FIG. 2, rich media content 410, in FIG. 4, includes UI framework 414a ported to embedded graphics environment 412a, and accessible by content management system 404 via UI layout feed 416.

However, in FIG. 4, rich media content 410 is also provided with UI framework 414b ported to embedded graphics environment 412b. Also shown in FIG. 4 are packet network 406 and client systems 408 and 409, corresponding respectively to packet network 206 and client system 208, in FIG. 2.

According to the embodiment of FIG. 4, a designer (not shown in FIG. 4) of rich media content 410 may utilize content management system 404 and single UI layout feed 416 to communicate graphical layout specifications to UI frameworks 414a and 414b, and thus to produce and/or modify display assets displayed by both embedded graphics environments 412a and 412b. As a result, consumers (also not shown in FIG. 4) using distinct client systems 408 and 409, supporting distinct graphics environments, are able to enjoy substantially the same rich media content 410. Furthermore, modifications to the display assets presented by rich media content 410 may be concurrently updated across embedded graphics environments 412a and 412b to provide the consumers using client systems 408 and 409 with rich media content having substantially the same look and feel.

By incorporating the user interface framework into application source code produced to deliver rich media content, the present disclosure describes an approach to providing rich media content that enables modification of graphical layout without recoding or recompiling the application. By utilizing a user interface layout feed to specify the graphical layout of the rich media content, the present disclosure describes an approach enabling selection and modification of display assets directly by a designer using a content management system. Moreover, by providing the user interface layout feed in a generalized data format, the present application discloses a solution enabling a designer to render graphical layout modifications concurrently across multiple graphics environments.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system enabling dynamic updating of contents, the system comprising:
   a content server computer accessible over a packet network;
   a rich media content generated by a compiling of a rich media source code, wherein the rich media content is hosted by the content server, the rich media content including:
   a first embedded graphics environment configured to present display assets of the rich media content; and
   a first user interface (UI) framework ported to the first embedded graphics environment, the first UI framework configured to interact with the first embedded graphics environment to modify the display assets of the rich media content in response to data received from a UI layout feed;
   wherein the first UI framework is further configured to modify the display assets of the rich media content without requiring modifications to the rich media source code and a recompiling of the rich media source code.

2. The system of claim 1, wherein the first UI framework is further configured to respond to its own events, so as to override or cancel native embedded graphics environment defined events as they occur.

3. The system of claim 1, wherein the first UI framework comprises a universal component library.

4. The system of claim 1, wherein the first UI framework comprises a variety of data containers.

5. The system of claim 1, wherein the first embedded graphics environment comprises Flash.

6. The system of claim 5, wherein the first UI framework is ported to Flash by being distributed through archive .swc files, runtime shared libraries, and ActionScript 3.0 files.

7. The system of claim 1, wherein the first embedded graphics environment is one of Silverlight or Java.

8. The system of claim 1, wherein the UI layout feed comprises an Extensible Markup Language (XML) feed.

9. The system of claim 1, wherein the UI layout feed comprises a JavaScript Object Notation (JSON) feed.

10. The system of claim 1, further comprising:
    a second UI framework ported to a second embedded graphics environment, the second UI framework configured to interact with the second embedded graphics environment to modify the display assets of the rich media content in response to data received from the UI layout feed;
    the system configured to enable modification of the display assets of the rich media content across the first embedded graphics environment and the second embedded graphics environment concurrently.

11. The system of claim 1, further comprising a content management system configured to provide the UI layout feed.

12. A method enabling dynamic updating of contents, the method comprising:
    producing a rich media source code, the rich media source code incorporating a user interface (UI) framework;
    compiling the rich media source code to generate a rich media content;
    publishing the rich media content on a content server accessible over a packet network;
    receiving data from a UI layout feed for determining display assets of the rich media content; and
    modifying the display assets of the rich media content using the UI framework in response to the data from the UI layout feed;
    wherein the UI framework modifies the display assets of the rich media content without requiring modifications to the rich media source code and a recompiling of the rich media source code.

13. The method of claim 12, wherein the UI framework is configured to respond to its own events, so as to override or cancel native events of an embedded graphics environment of the rich media content as they occur.

14. The method of claim 13, the first embedded graphics environment comprises Flash.

15. The method of claim 12, wherein providing the UI layout feed comprises providing an Extensible Markup Language (XML) feed.

16. The method of claim 12, wherein providing the UI layout feed comprises providing a JavaScript Object Notation (JSON) feed.

17. The method of claim 12, wherein the UI framework comprises a universal component library.

18. The method of claim 12, wherein the UI framework comprises a variety of data containers.

* * * * *